United States Patent [19]

Cryer

[11] Patent Number: 5,629,505
[45] Date of Patent: May 13, 1997

[54] ROTARY SWITCH ASSEMBLY

[75] Inventor: Edward Cryer, Burnley, United Kingdom

[73] Assignee: Lucas Industries, Public Limited Company, England

[21] Appl. No.: 343,675

[22] Filed: Nov. 22, 1994

[30] Foreign Application Priority Data

Nov. 23, 1993 [GB] United Kingdom ............... 9324039

[51] Int. Cl.⁶ ............................................. H01H 9/00
[52] U.S. Cl. ............................ 200/61.54; 200/50.32
[58] Field of Search .................. 200/4, 5 R, 11 R, 200/14, 11 D, 11 J, 17 R, 18, 61.27, 61.54, 50 R, 50 C, 336, 50.01, 50.32, 50.34, 50.35, 50.37

[56] References Cited

U.S. PATENT DOCUMENTS

| | | | |
|---|---|---|---|
| 4,387,279 | 6/1983 | Brevick | 200/61.54 |
| 5,003,132 | 3/1991 | Lagier | 200/4 |
| 5,107,243 | 4/1992 | Maeda | 338/172 |
| 5,272,290 | 12/1993 | Suzuki et al. | 200/4 |
| 5,430,265 | 7/1995 | Beattie et al. | 200/61.54 |

FOREIGN PATENT DOCUMENTS

| | | | |
|---|---|---|---|
| 389366 | 3/1990 | European Pat. Off. | H01H 19/14 |
| 446126 | 3/1991 | European Pat. Off. | B60R 16/00 |

*Primary Examiner*—Michael L. Gellner
*Assistant Examiner*—Michael A. Friedhofer
*Attorney, Agent, or Firm*—Andrus, Sceales, Starke & Sawall

[57] ABSTRACT

A switch assembly having a relatively fixed component, a first switch operating member rotatable relative to the fixed component between first and second stable positions, a second switch operating member rotatable with respect to the fixed component between first and second stable positions, switch contacts associated with each of the switch operating members in order to control the operation of respective electrical circuits, and a latch member responsive to the first operating member occupying its first position for applying a moment to the second operating member to restore it to its first position.

8 Claims, 1 Drawing Sheet

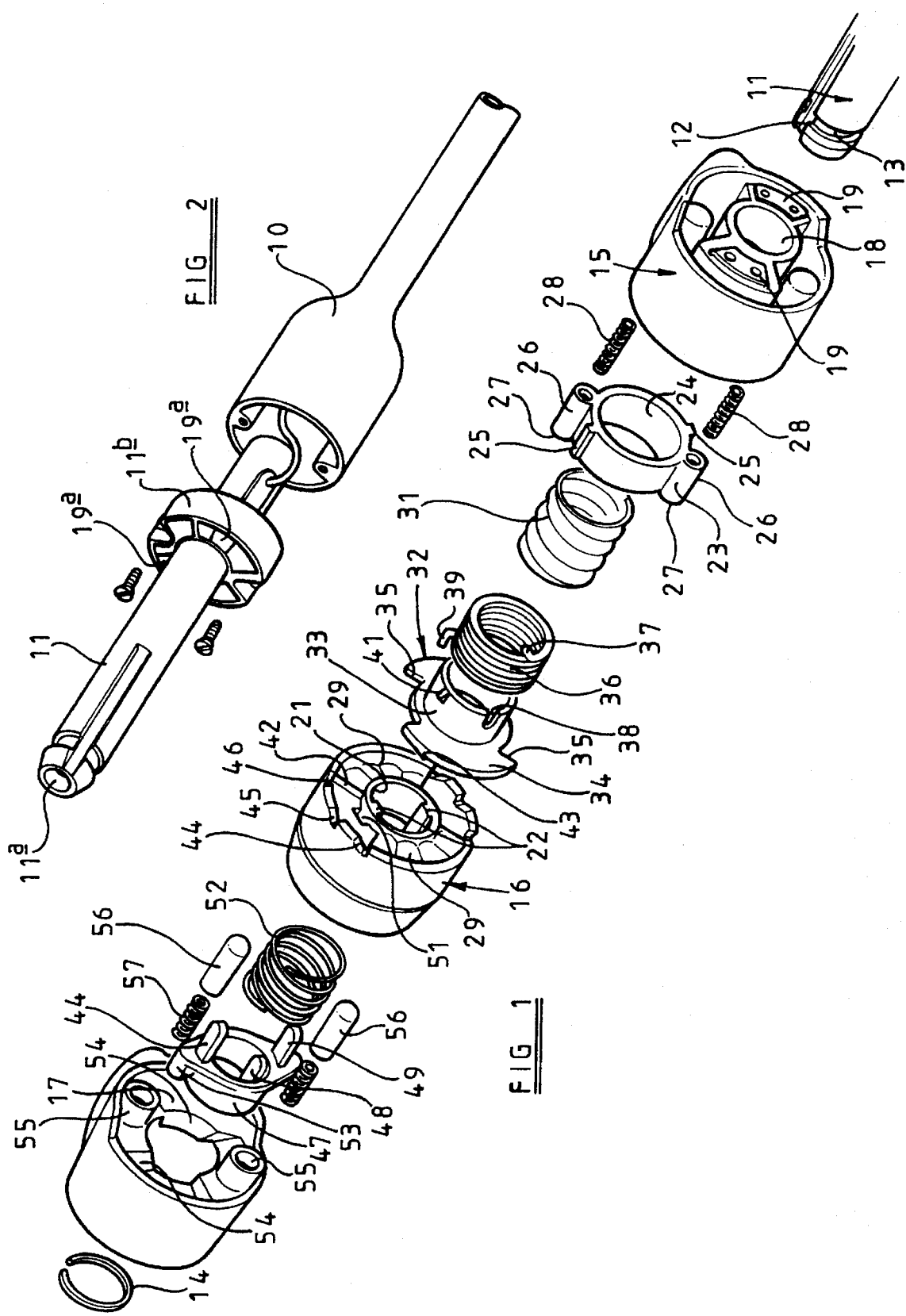

ROTARY SWITCH ASSEMBLY

BACKGROUND OF THE INVENTION

This invention relates to a rotary switch assembly, primarily, but not exclusively, intended for use as a lighting control switch for a road vehicle.

It is known to provide a rotary switch assembly where a rotatable operating member has three stable positions corresponding respectively to a off position, a side lights on position, and a side lights and headlights on condition. It is also known to provide a switching assembly for controlling fog lights of the vehicle the assembly having positions in which the fog lights are off; only the front fog lights are on; both front and rear fog lights are on.

SUMMARY OF THE INVENTION

It is an object of the present invention to provide a rotary switch assembly having a first operating member which can be used to control energisation of the side lights and headlights of the vehicle, a second operating member which can be used to control energisation of the front and rear fog lights of the vehicle, and means ensuring that the second operating member is returned to its off position when the first operating member is in its off position.

In accordance with the present invention there is provided a rotary switch assembly including a first, relatively fixed component, a first switch operating member rotatable relative to said first component between first and second stable positions, electrical contacts operable by said first operating member, a second switch operating member rotatable relative to said first component between first and second positions, further switch contacts operable by said second operating member and, means responsive to the first operating member occupying its first position for applying a moment to the second operating member to restore it to its first position.

The switch assembly preferably further comprises a latch member movable between a latched position and an unlatched position in which the moment is applied to the second operating member to restore it to its first position. The latch member is preferably biased towards its latched position.

Preferably, the latch member is biased so as to rotate with respect to the first component when in its unlatched position in order to restore the second operating member to its first position.

The latch member is preferably provided with a tooth arranged to engage with a selected one of a plurality of recesses provided in the first component when the latch member is in its latched position, and to be disengaged therefrom when in its unlatched position.

The switch assembly preferably further comprises actuator means associated with the first operating member arranged to move the latch member to its unlatched position when the first operating member is in its first position, the actuator means preferably comprising at least one prong arranged to engage the latch member, the prong being reciprocable under the influence of a cam surface provided on the first operating member.

Preferably the first and second operating members are coaxial with one another. The switch assembly preferably further comprises detent means arranged to define predetermined rotational positions of the first and second operating members relative to said first component.

BRIEF DESCRIPTION OF THE DRAWING

In the accompanying drawings FIG. 1 is an exploded perspective view of part of an electrical switch assembly in accordance with a first example of the present invention, and FIG. 2 is a view similar to FIG. 1 of a further part of the switch assembly.

DETAILED DESCRIPTION OF THE PREFERRED EMBODIMENT

Referring to the drawings, the switch illustrated is a lighting control switch for a road vehicle, and is intended to effect control over the side light and headlight circuits of the vehicle and front and rear fog light circuits of the vehicle.

The switch assembly includes a moulded supporting shaft 11 upon which other components of the switch assembly are mounted, and which, in relation to the switch assembly, is stationary. The shaft 11 is secured to the operating lever 10 of a further electrical switch for example a direction indicator switch, and is formed with a through bore 11a and diametrically opposed axially extending grooves one of which is shown at 12. Additionally, adjacent its free end the shaft 11 has a circumferential groove 13 for receiving a circlip 14 retaining the components of the switch assembly axially on the shaft.

The switch assembly includes three major, coaxially arranged components which together define the external shape of the switch assembly. These three components are, respectively, a fog light operating member 15, a fixed body part 16, and a side light and headlight operating member 17. The fog light operating member 15 is a hollow, generally cylindrical synthetic resin moulding having an integral, centrally disposed hollow boss 18 receiving the shaft 11 rotatably to mount the operating member 15 on the shaft. A further fixed body part 11b is formed integrally with the shaft 11 remote from the free end of the shaft and one end of the operating member 15 abuts this further fixed body part. The body part 11b is secured screws to the operating lever 10 of the direction indicator or other switch and thus serves to secure the whole assembly to the lever 10. Electrical contact members 19 carried by the operating member 15 coact with additional electrical contact members (indicated diagrammatically at 19a) on the body part 11b to define, in three angularly spaced positions of the operating member 15 respectively, an off position in which none of the fog light circuits can be energised, a front-fog position in which the circuits of the front fog lights of the vehicle can be energised, and a front-fog and rear-fog position in which both the front and rear fog light circuits of the vehicle can be energised. The manner in which the three predetermined positions of the operating member 15 are defined will be described hereinafter. It will be recognised that the outer surface of the operating member 15, although generally cylindrical, can be shaped to provide one or more protrusions which facilitate gripping the operating member 15 to rotate it, and which also provide a visual indication of the rotated position of the operating member 15. Conveniently the shaft 11 and body part 11b are moulded with the contact members 19a and their electrical connecting leads in situ.

The fixed body part 16 similarly is a synthetic resin moulding having an integral central boss 21 receiving the shaft 11 protruding through the operating member 15. The outer surface of the body part 16 is of stepped cylindrical form, the region of smaller diameter being presented to and received within the mutually presented end region of the operating member 15. As is apparent from the drawing a number of components are disposed between the operating member 15 and the body part 16, mainly within the confines of the hollow operating member 15. The inner cylindrical surface of the boss 21 of the body part 16 is formed with integral, diametrically opposed, axially extending keys which are received in the grooves 12 of the shaft respectively so that the body part 16 can be axially assembled onto the shaft 11, but cannot rotate relative thereto.

The end of the body part 16 remote from the operating member 15 is closely adjacent an end of the generally cylindrical, moulded synthetic resin operating member 17. Again the external shaping of the operating member 17 may have one or more protrusions to facilitate rotating the operating member, and also to provide a visual indication of its angular position. The operating member 17 includes a centrally disposed integral boss through which the free end region of the shaft 11 extends, the circlip 14 engaging the free end region of the shaft 11 within a recess in the outer end of the operating member 17. In use the open end of the recess (not shown) in the operating member 17 is closed by a snap-fit cover so that the end of the shaft 11 and the circlip 14 are hidden from view.

As mentioned above the operating member 17 is rotatable on the shaft 11, and a link-rod (not shown) extending through the axial bore 11a of the shaft 11 couples the operating member 17 to an electrical switching arrangement housed within the body (not shown) of the direction indicator or other switch, so that rotation of the operating member 17 relative to the shaft 11 between first, second and third predetermined angular positions effects control over the side light and headlight operating circuits of the vehicle.

The operating member 15 is hollow, and received therein is a moulded synthetic resin detent collar 23. The collar 23 comprises a cylindrical sleeve 24 through which the shaft 11 extends, the sleeve having integral, diametrically opposed axially extending keys 25 on its outer surface, the keys 25 being received within corresponding key ways (not shown) within the operating member 15 so that the collar 24 is constrained to rotate with the operating member 15, but can be moved axially relative thereto. Also integral with the sleeve 24 are first and second hollow detent posts 26, the posts 26 being disposed diametrically opposite one another on the outer surface of the sleeve 24 extending parallel to the axis of the sleeve. The posts 26 are open at their ends presented to the operating member 15 and their opposite ends protrude beyond the axial end of the sleeve 24 and define hemispherical abutments 27. Respective helical compression springs 28 are partly received with the hollow posts 26 and extend rearwardly to abut the operating member 15. Thus the springs 28 urge the collar 23 towards the body part 16, and the recessed face of the body part 16 presented to the operating member 15 has respective arcuate detent formations 29 with which the hemispherical abutments 27 of the collar 23 coact to define the first, second and third predetermined angular positions of the operating member 15 relative to the fixed parts of the switch assembly, those positions corresponding in use to a fog lights off; a front fog lights on; and a front and rear fog lights on position respectively.

The inner diameter of the sleeve 24 of the collar 23 is significantly greater than the outer diameter of the shaft 11, and a light helical compression spring 31 extends through the sleeve 24, encircling the shaft 11, and at one end abuts an internal wall of the operating member 15. The opposite end of the spring 31 abuts one axial end of an operating member return element 32 to urge the element 32 towards the body part 16. The element 32 is a moulded synthetic resin component comprising a cylindrical sleeve 33 with an integral disc 34 at its end presented to the body part 16. The disc 34 is cut away in two diametrically opposed regions to define first and second diametrically opposed, identical, arcuate slots 35. Encircling the outer surface of the sleeve 33 is a helically wound torsion spring 36 one end 37 of which is turned inwardly to be received in an axially extending slot 38 of the sleeve 33, and the other end 39 of which extends axially through one of the arcuate slots 35 to cooperate with the body part 16. A catch member 41 on the sleeve 33 locates the spring 36 axially on the sleeve 33, and the outer diameter of the spring 36 is such that the spring 36 and sleeve 33 can be received within the sleeve 24 of the collar 23. The posts 26 which, as mentioned above, protrude beyond the axial end of the sleeve 24, extend through the arcuate slots 35 of the disc 34 to abut the detent forms 29.

The axially extending region 39 of the spring 36 extends through one of the slots 35, between a detent post 26 and the counter-clockwise end of the slot, to coact with a radial abutment 42 formed on the body part 16. The axial end 39 of the spring 36 engages the abutment 42 in the rest position of the components, and as will become clear from the following description the intended rotation of the components from the rest position is in a clockwise direction (as viewed in the drawing) and the end 39 of the spring 36 thus remains in contact with the abutment 42. The outer diameter of the disc 34 is equal to the outer diameter of the smaller diameter region of the body part 16 and thus the periphery of the disc lies adjacent the body part 16. Protruding from the face of the disc 34 towards the body part 16 and between the slots 35 are first and second diametrically opposed latch projections 43 (only one of which can be seen in the drawing). The latch projections 43 are each in the form of an inclined ramp commencing at the surface of the end face of the disc 34 and terminating in an axially extending step. Thus in a notional circumferential cross-section the projections 43 would each have generally the form of a right-angle triangle the hypotenuse of which is the ramp surface.

The axial end of the outer cylindrical region of the body part 16 within the operating member 15 has two diametrically opposed sets of three circumferentially spaced notches 44, 45, 46 respectively, the shape of the notches corresponding to the projections 43 so that the projections 43 can be received therein. When the projections 43 are engaged in the diametrically opposed notches 44 the axial end 39 of the spring 36 is in contact with the radial abutment 42 of the fixed body part 16. Thus rotating the element 32 clockwise to engage the projections 43 in the diametrically opposed notches 45 stresses the spring 36, and the spring 36 is stressed further by rotating the element 32 to engage the projections 43 in the notches 46. The inclined ramps of the projections 43 and the corresponding shaping of the notches 44–46 is such that the collar 32 can readily be rotated to move the projections 43 progressively from the notches 44 to the notches 45 and then the notches 46, the accompanying axial movement of the element 32 being resisted by the spring 31. Thus when a projection 43 aligns with a notch the spring 31 drives the element 32 towards the body part 16 to engage the projection in the notch. The element 32 is urged towards its rest position, where the projections 43 align with the notches 44 by the torsion spring 36 but such movement solely under the action of the spring 36 is prevented by the axial steps of the projections 43 abutting the corresponding faces of the notches 45 or 46 respectively.

Assuming that the operating member 15 and the element 32 are in their rest position, that is to say their counter-clockwise limit position then the detent post 26 will engage the counter-clockwise end regions of the detent forms 29 and will also be engaged with the clockwise ends of the slots 35 of the element 32. In the rest position the electrical contacts associated with the operating member 15 are such that none of the fog light circuits of the vehicle can be completed. Rotation of the operating member 15 in a clockwise direction from the rest position carries the detent collar 23 with it, and thus the hemispherical abutments 27 of the collar 23 ride over the first projections of the respective detent forms 29 and into the first recesses thereof to define the second position of the operating member 15 relative to the body part 16. The necessary axial movement of the collar 23 during the progression over the high points of the detent forms 29 as the operating member 15 is moved from the first, rest position to the second position is of course resisted by the springs 28. Moreover, the posts 26 of the collar 23 abutting the clockwise ends of the slots 35 of the element 32 will drive the element 32 in a clockwise direction so that the projections 43 disengage from the notches 44 and engage in the notches 45 of the body part 16. In the second position of the operating member 15 the associated electrical contacts are positioned such that the front fog light circuits of the vehicle can be energised. Rotation of the operating member 15 further in a clockwise direction achieves the third position of the operating member 15 in which the circuits of both the front and rear fog lights of the vehicle can be energised, and the element 32 has been driven further in a clockwise direction so that the projections 43 engage in the notches 46.

It will be understood that notwithstanding that the operating member 15 is in a second or third position energisation of the fog lights may be dependent on closure of some other switch, for example the ignition switch of the vehicle and/or the lighting switch. Some countries make it a requirement that the headlights of the vehicle must be energised before the front and rear fog lights can be energised, and thus an electrical feed to the headlights of the vehicle may be a pre-requisite for energisation of the fog lights notwithstanding the position of the operating member 15.

With the operating member 15 in its second or third position the element 32 will be in its second or third position, but counter-clockwise rotation of the operating member 15 will return the operating member 15 to its second or its first position leaving the element 32 in the second or third position. It must be understood therefore that return (counter-clockwise) rotation of the operating member 15 manually does not carry with it the element 32, and thus during return rotation of the operating member 15 the posts 26 of the collar 23 move along the arcuate slots 35 of the element 32 away from the clockwise ends thereof.

Disposed between the operating member 17 and the fixed body part 16 is a latch release member 47 in the form of a moulded synthetic resin sleeve through which the shaft 11 extends. The inner surface of the sleeve of the member 47 has integral, diametrically opposed, axially extending keys, one of which is shown at 48, which are received respectively in the grooves 12 of the shaft 11 to ensure that the member 47 is held against rotation relative to the shaft 11 but can be moved axially relative thereto. Projecting axially from the face of the member 47 presented to the body part 16 are first and second diametrically opposed prongs 49 which extend within corresponding passageways 51 of the body part 16. The axial length of the prongs 49 is such that they can protrude completely through the passageways 51 to abut the disc 34 of the element 32. A light helical compression spring 52 is interposed between the member 47 and the body part 16 to urge the member 47 towards the operating member 17. At its end received within the operating member 17 the latch release member 47 is formed integrally with first and second diametrically opposed cam followers 53 which abut respective, identical, diametrically opposed cam 54 forms on the recessed end face of the operating member 17. The cam forms 54 are such that in the first, rest position of the operating member 17 the cam followers 53 are engaged on high points of the cam forms 54 so that the latch release member 47 is displaced axially against the action of the spring 52 towards the body part 16, whereas in the second and third angular positions of the operating member 17 the cam followers 53 are engaged with low points of the cam forms 54 so that the member 47 is retracted by the spring 52 in a direction away from the body part 16.

The operating member 17 is formed internally with first and second hollow, diametrically opposed and axially extending columns 55 slidably receiving respective detent pins 56 each which protrudes from its respective column 55 and is urged towards the body part 16 by a respective helical compression spring 57. The outer ends of the pins 56 are part spherical, and abut respective detent tracks formed within the recessed region of the body part 16 presented to the operating member 17. These tracks are not visible in the drawing, but in known manner define first, second and third stable positions of the operating member 17 relative to the body part 16.

It will be recalled that rotation of the operating member 17 operates contacts through the intermediary of a link-rod not shown. In the first position of the operating member 17 relative to the body part 16 neither the side light circuits, nor the headlight circuits of the vehicle can be energised and thus the first position of the operating member 15 is a rest position. It is intended that in the second position of the operating member 17 achieved by clockwise rotation from the first position contacts will be closed such that the side light circuits of the vehicle are energised. In the third stable position of the operating member 17 it is intended that contacts will be operated such that the headlight circuits of the vehicle can be energised, although it will be understood that in some applications closure of, for example, the ignition switch of the vehicle is necessary in order for the headlights actually to be energised irrespective of the position of the operating member 17.

It is a fundamental requirement that neither of the fog light circuits of the vehicle can remain energised when the lights of the vehicle are switched off, that is to say when the operating member 17 is returned to its first position. It will be recalled that the operating member 15 can be rotated to its second or third position irrespective of the position of the operating member 17, and can be manually rotated back to its first position, again irrespective of the position of the operating member 17. However, if the operating member 15 is in its second or third position when the operating member 17 is returned to its first position then the return of the operating member 17 to its first position will automatically return the operating member 15 to its first position as follows. Return of the operating member 17 to its first position displaces the member 47 against the action of the spring 52 in a direction towards the body part 16. During this movement the prongs 49 of the member 47 are caused to protrude through their respective passages 51 to abut the disc 34 of the element 32, and to displace the element 32 against the action of the spring 31 towards the operating member 15. Such axial displacement of the element 52 disengages the projections 43 from the notches 45 or 46 (dependent upon whether the element 32 is in its second or its third position) and thereupon the spring 36 drives the element 32 back to its first position. The return movement of the element 32 towards its first position carries with it the operating member 15 through the intermediary of the detent collar 23. If the operating member 15 was in its third position then the element 32 would of course have been in its third position and the posts 26 would have been already abutting the clockwise end faces of the slots 35. Thus the return movement of the element 32 under the action of the spring 36 will carry with it the operating member 15, the spring 36 being sufficiently strong to overcome the detent action of the hemispherical abutments 27 in the detent forms 29. It is of course conceivable that the operating member 15 would have been moved manually from its third position to its second position leaving the element 32 in the third position. In such circumstances then during the counter-clockwise return movement of the element 32 under the action of the spring 36 the clockwise ends of the slots 35 would be brought into engagement with the posts 26 and thereafter the element 32 will carry the operating member from the second position to the third position.

It will be recognised that while the operating member 17 is in its first position the member 47 is displaced axially against the spring 52 such that the element 32 is displaced axially against the action of the spring 31 to a position in which the projections 43 are clear of the notches 44, 45, 46. Thus although, with the operating member 17 in its first position, it is possible manually to rotate the operating member 15 to its second and third positions the operating member 15 cannot remain in the second and third positions since the spring 36 will restore it to its first position. It is only when the operating member 17 is in its second or third position that the element 32 can latch in a second or third position against the action of the spring 36 thus permitting the operating member 15 to remain in its second or third position.

There may be operating environments where it is essential that the operating member 15 can only remain in its second or third position while the operating member 17 is in its third position. For example some countries may have a requirement that the fog lights cannot be maintained energised unless the headlamps are also energised. Such an operating arrangement could be achieved by modifying the cam forms 54 so that the high points of the cam forms occupy the first and second positions of the operating member 17 and the lower point thereof corresponds only to the third position. Thus in such an arrangement the member 47 would be deflected axially against the spring 53 to displace the element 32 in both the first and second positions of the operating member 17.

It will be recognised that the switch assembly disclosed above is not restricted in its use to the control of lighting circuits in a road vehicle. Moreover, the same principles of operation can be applied to switch assemblies having more than three operating positions in relation to one or both operating members. Still further it will be recognised that by appropriate design of the cam forms 54 restoration of the operating member 15 to a predetermined position can be achieved in alternative predetermined positions of the operating member 17. Thus to take a simple example which would not be suitable for the lighting environment disclosed above, but might be suitable in other environments, it would be possible to have the high point of the cam forms 54 corresponding to the second position of the operating member 17, with low points of the cam corresponding to the first and third positions of the operating member 17. With such an arrangement movement of the operating member 17 either from the first position to the second position, or from the third position to the second position would effect restoration of the operating member 15 to a predetermined, (probably the first), position while the full range of operation of the operating member 15 would be permitted in either the first, or third positions of the operating member 17. It follows also that the switch could be so designed that the position to which the operating member 15 is restored by release of the latch element 32 need not necessarily be a position at the limit of the freedom of travel of the operating member 15. There might for example be a manually achievable position by rotating the operating member 15 counter-clockwise beyond the position to which it is returned by the spring 36. Variations along these lines are within the scope of the present invention.

I claim:

1. A switch assembly including a first, relative fixed component, a first switch operating member rotatable relative to said first component between first and second stable positions, electrical switch contacts operable by said first operating member, a second switch operating member rotatable relative to said first component between first and second positions, further switch contacts operable by said second operating member and a resilient device arranged to be stressed from a rest condition by movement of said second operating member from said first position to said second position, a releasable latch mechanism for retaining said resilient device stressed, and, a release mechanism responsive to said first operating member occupying said first stable position for releasing said latch mechanism, whereby said resilient device restores to said rest condition carrying said second operating member from said second position to said first position.

2. A switch assembly as claimed in claim 1, wherein said latch mechanism is biased towards a latch position.

3. A switch assembly as claimed in claim 1, wherein said latch mechanism includes a tooth arranged to engage in a selected one of a plurality of recesses provided in said first component when said latch mechanism is in said latch condition and to be disengaged therefrom when said latch mechanism is released.

4. A switch assembly as claimed in claim 1, wherein said release mechanism comprises at least one prong arranged to engage the latch mechanism, said prong being moveable to release said latch mechanism by engagement with a cam surface provided on said first operating member.

5. A switch assembly as claimed in claim 1, wherein the first and second operating members are coaxial with one another.

6. A switch assembly as claimed in claim 1, further comprising respective detent arrangements arranged to define predetermined rotation positions of said first and second operating members respectively relative to said first component.

7. A switch assembly including a first, relative fixed component, a first switch operating member rotatable relative to said first component between first and second stable positions, electrical switch contacts operable by said first operating member, a second switch operating member rotatable relative to said first component between first and second positions, further switch contacts operable by said second operating member and, resilient means responsive to the first operating member being in said first stable position for applying a moment to the second operating member to restore the second member to said first position.

8. A switch assembly including a first, relative fixed component, a first switch operating member rotatable relative to said first component between first and second stable positions, electrical switch contacts operable by said first operating member, a second switch operating member rotatable relative to said first component between first and second positions, further switch contacts operable by said second operating member, biasing means for applying a moment to the second operating member in said second position tending to restore said second operating member to said first position and, releasable latch means responsive to the first operating member being in said first stable position for releasing said biasing means to restore said second operating member to said first position.

* * * * *